United States Patent [19]

Emmett et al.

[11] Patent Number: 4,552,015
[45] Date of Patent: Nov. 12, 1985

[54] FUEL CONSUMPTION MEASURING SYSTEM

[75] Inventors: David P. Emmett, Haslett; Duane D. Muelling, Milford; Ronald J. Willett, Pinckney, all of Mich.

[73] Assignee: General Motors Corporation, Detroit, Mich.

[21] Appl. No.: 578,538

[22] Filed: Feb. 9, 1984

[51] Int. Cl.$^4$ ............................................. G01M 15/00
[52] U.S. Cl. .................................... 73/113; 73/119 A
[58] Field of Search .............. 73/113, 119 A; 123/541

[56] References Cited

U.S. PATENT DOCUMENTS

| | | | |
|---|---|---|---|
| 3,831,439 | 8/1974 | Konomi | 73/113 |
| 3,973,536 | 8/1976 | Zelders | 73/113 X |
| 4,253,330 | 3/1981 | Kato | 73/113 |
| 4,411,239 | 10/1983 | Kelch | 123/541 X |

Primary Examiner—Jerry W. Myracle
Attorney, Agent, or Firm—Howard N. Conkey

[57] ABSTRACT

An internal combustion engine fuel consumption measurement system including an auxiliary fuel reservoir from which the engine fuel requirements are supplied and into which make-up fuel is provided to maintain a constant fuel volume and pressure. The make-up fuel quantity is measured as an indication of the fuel consumption of the internal combustion engine.

1 Claim, 1 Drawing Figure

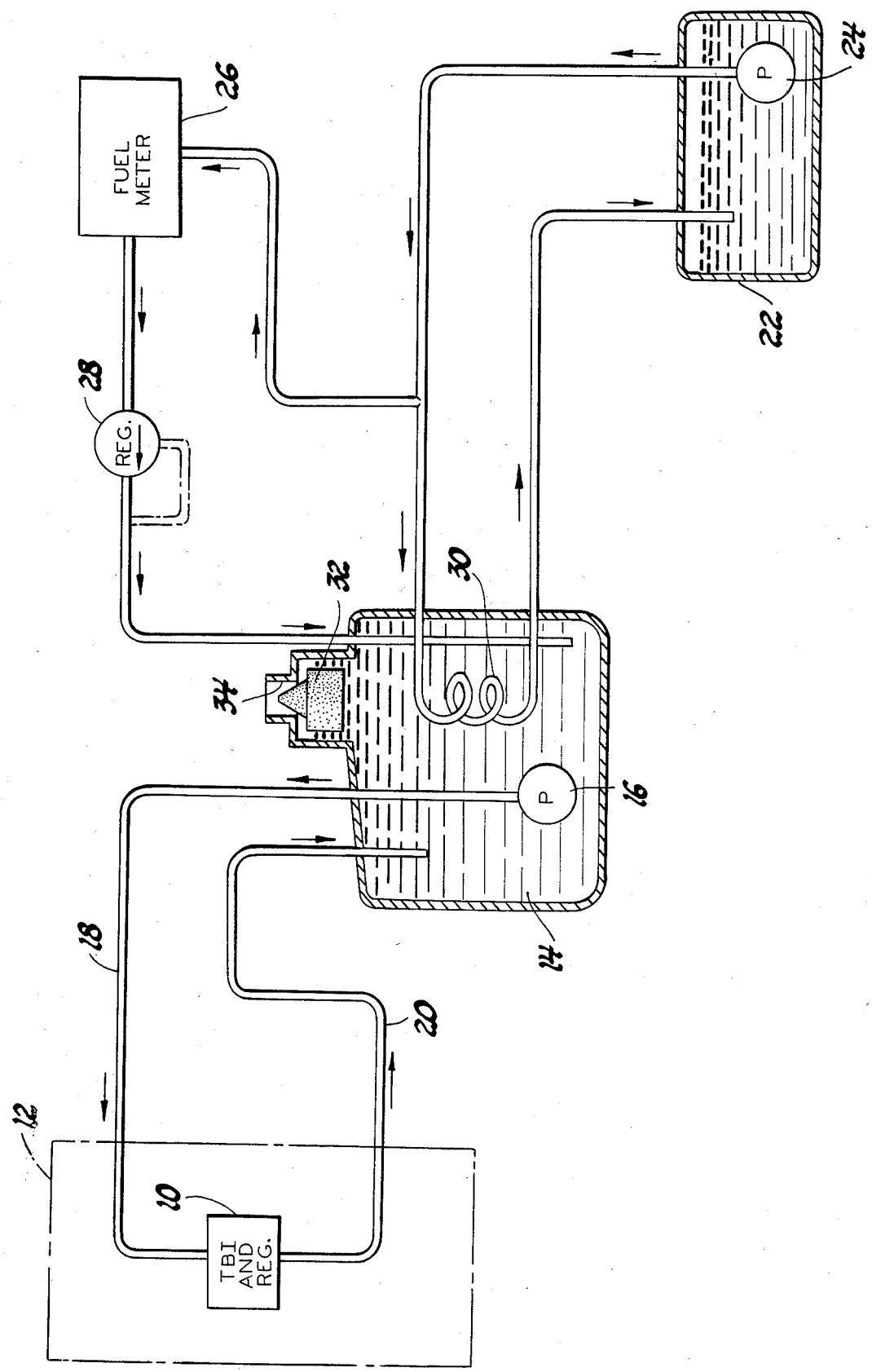

FUEL CONSUMPTION MEASURING SYSTEM

This invention relates to a system for accurately providing a measurement of the fuel consumption of an internal combustion engine.

There has been an increasing need for a fuel consumption measurement apparatus for accurately measuring the fuel consumption of an internal combustion engine. For example, an accurate fuel consumption measuring apparatus would enable accurate determination of vehicle fuel economy and enable calibration of an engine fuel delivery system so as to optimize vehicle economy and emissions.

Various systems have been proposed for measuring engine fuel consumption. One of these known systems provides for a fuel container from which fuel is supplied to the engine. A level sensor in the form of a float or probe is positioned in the container and is operative when the fuel level in the container falls below a predetermined level to enable a make-up fuel supply system to re-supply the fuel in the container to the predetermined level. The make-up fuel required to maintain the fuel level in the container at the predetermined level represents the fuel consumption of the engine.

While the foregoing known system provides a general indication of the fuel consumption of the engine, delays are experienced in the make-up flow into the container from which the engine fuel is drawn during full throttle acceleration of the engine. Further, systems using float or probe controlled fuel make-up experience on/off discontinuities in the measurement of the make-up fuel, particularly at engine idle.

It is the general object of this invention to provide for an improved fuel consumption measuring system for an internal combustion engine.

It is another object of this invention to provide for an improved fuel consumption measuring system for an internal combustion engine employing an auxiliary fuel reservoir (A) from which fuel is supplied to the engine, (B) into which unused fuel is returned and (C) into which make-up fuel is added, the make-up fuel being measured as an indication of engine fuel consumption.

It is another object of this invention to provide for a fuel consumption measuring system for an internal combustion engine as set forth in the foregoing objects that experiences no delay or discontinuity in fuel consumption measurement at all engine operating conditions.

The foregoing and other objects of this invention may be best understood by reference to the following description of a preferred embodiment and the single figured drawing of a system for measuring the fuel consumption of an internal combustion engine in accord with the principles of this invention.

The fuel consumption measurement system of this invention is illustrated in conjunction with a throttle body fuel injection system in which fuel from a source is supplied thereto at a regulated pressure and unused fuel is returned to the fuel source. Referring to the FIGURE, fuel is supplied to a throttle body injector and pressure regulator assembly 10 of an internal combustion engine 12 from an auxiliary fuel reservoir 14 by a conventional fuel delivery system that includes a fuel pump 16 immersed in the auxiliary fuel reservoir 14 and the associated fuel supply and return lines 18 and 20. This form of fuel delivery system is conventional and provides fuel to the injectors of the assembly 10 at a regulated pressure established by the regulator in the assembly 10. The excess fuel not injected into the engine 12 is returned to the auxiliary fuel reservoir 14.

The fuel measurement system of this invention maintains a constant volume of fuel at a predetermined pressure in the auxiliary fuel reservoir 14 by supplying make-up fuel thereto at the predetermined pressure as fuel is injected into the engine 12. The make-up fuel supplied to the auxiliary fuel reservoir to maintain the constant volume of fuel is measured, the measured amount being a measure of the fuel consumed by the engine 12.

Make-up fuel is provided to the auxiliary fuel reservoir 14 from the standard vehicle fuel tank 22. A conventional in-the-tank electric fuel pump 24 supplies fuel under pressure through a fuel meter 26 and a pressure regulator 28 into the auxiliary fuel reservoir 14. In this manner, the auxiliary fuel reservoir 14 is maintained full at a pressure established by the regulator 28. Since the auxiliary fuel reservoir 14 is maintained full, the volume of fuel in the reservoir 14 is a constant so that the make-up fuel provided to the reservoir 14 through the fuel meter 26 is a measure of the fuel injected into the engine 12 from the reservoir 14. The fuel meter 26 may take the form of any well known fluid flow meters and associated electronics such as a positive displacement flow meter.

To ensure there is no vapor present to displace the fuel so that the entire volume of the reservoir 14 is filled with fuel, a float 32 in cooperation with a vent 34 vents accumulated vapor from the reservoir 14. In the event vapor accumulates in the auxiliary fuel reservoir 14, the float 32 unseats from the vent 34 to vent the vapor from the reservoir as the fuel added to the reservoir displaces the vapor after which the vent 34 is again sealed by the float 32.

Fuel from the vehicle fuel tank 22 is also continuously circulated through a cooling coil 30 in the auxiliary fuel reservoir 14 so as to cool the fuel in the reservoir 14 to approximately the same temperature as the fuel in the vehicle fuel tank 22. This cooling helps to avoid fuel vaporization in the auxiliary reservoir 14 and in the fuel injection system.

The system described maintains a constant pressurized volume of fuel in the reservoir 14. Any decrease in pressure due to fuel injected into the engine is immediately restored by make-up fuel through the fuel meter 26 and pressure regulator 28. This manner in providing make-up fuel allows full throttle acceleration rates of the engine 12 with no delay in the make-up fuel flow from the fuel tank 22 so that no delays are experienced in the measurement of the fuel consumption of the engine 12. In addition, since the make-up fuel is not float or probe controlled, there are no on/off discontinuities in the measured fuel supplied to the auxiliary reservoir 14 even at an engine idle condition.

In summary, the fuel consumption of the engine 10 is measured via a make-up fuel loop supplying make-up fuel at a predetermined pressure to a constant volume auxiliary fuel reservoir, the amount of fuel to maintain the pressurized constant volume of fuel in the auxiliary fuel reservoir providing a measurement of the fuel consumption of the engine.

The foregoing description of a preferred embodiment for purposes of illustrating the invention is not to be considered as restricting or limiting the invention since many modifications may be made by the exercise of skill in the art without departing from the scope of the invention.

The embodiments of the invention in which an exclusive property or privilege is claimed are defined as follows:

1. A fuel consumption measuring system for use with an internal combustion engine comprising, in combination:

a main fuel reservoir;

an auxiliary fuel reservoir;

engine fuel delivery means;

means effective to supply fuel from the auxiliary fuel reservoir to the engine fuel delivery means and to return unused fuel to the auxiliary fuel reservoir;

means effective to supply fuel from the main fuel reservoir to the auxiliary fuel reservoir at a predetermined pressure so that the auxiliary fuel reservoir is maintained full and at the predetermined pressure;

means effective to vent vapors from the auxiliary fuel reservoir so that a constant volume of fuel is maintained in the auxiliary fuel reservoir;

a cooling coil in the auxiliary fuel reservoir;

means effective to circulate fuel from the main fuel reservoir through the cooling coil so as to cool the fuel in the auxiliary fuel reservoir; and measuring means effective to measure the fuel flow from the main fuel reservoir to the auxiliary fuel reservoir, the measured flow being equal to the fuel delivered to the engine by the engine fuel delivery means, whereby the pressurized fuel in the auxiliary fuel reservoir allows maximum engine acceleration rates with no delay in the make-up flow from the main fuel reservoir.

* * * * *